United States Patent
Praske et al.

(10) Patent No.: US 9,084,313 B2
(45) Date of Patent: Jul. 14, 2015

(54) SMART BULB SYSTEM

(75) Inventors: Robert M. Praske, El Dorado Hills, CA (US); Stephen R. Rumbaugh, Martinez, CA (US); Grant E. Hardesty, Livermore, CA (US); Thomas A. Hamilton, San Jose, CA (US)

(73) Assignee: ANYCOMM CORPORATION, El Dorado, CA (US)

( * ) Notice: Subject to any disclaimer, the term of this patent is extended or adjusted under 35 U.S.C. 154(b) by 542 days.

(21) Appl. No.: 13/397,490

(22) Filed: Feb. 15, 2012

(65) Prior Publication Data

US 2013/0211613 A1    Aug. 15, 2013

(51) Int. Cl.
*H05B 37/02* (2006.01)

(52) U.S. Cl.
CPC ............. *H05B 37/0272* (2013.01); *Y02B 20/48* (2013.01)

(58) Field of Classification Search
CPC ............................ H05B 37/0272; Y02B 20/48
USPC .............. 700/59–60, 295, 297; 315/291–297, 315/307–311; 705/7.11, 7.35
See application file for complete search history.

(56) References Cited

U.S. PATENT DOCUMENTS

| | | | | |
|---|---|---|---|---|
| 6,281,808 | B1* | 8/2001 | Glier et al. | 340/933 |
| 6,528,954 | B1* | 3/2003 | Lys et al. | 315/291 |
| 6,577,080 | B2* | 6/2003 | Lys et al. | 315/362 |
| 7,242,152 | B2* | 7/2007 | Dowling et al. | 315/291 |
| 8,442,785 | B2* | 5/2013 | Walters et al. | 702/58 |
| 8,594,976 | B2* | 11/2013 | Dorogi et al. | 702/182 |
| 8,624,895 | B2* | 1/2014 | Reese et al. | 345/426 |
| 8,710,770 | B2* | 4/2014 | Woytowitz | 315/307 |
| 2003/0050737 | A1* | 3/2003 | Osann, Jr. | 700/276 |
| 2009/0037008 | A1* | 2/2009 | Moorer et al. | 700/94 |
| 2010/0141153 | A1* | 6/2010 | Recker et al. | 315/149 |
| 2010/0176733 | A1* | 7/2010 | King | 315/158 |
| 2010/0301773 | A1* | 12/2010 | Chemel et al. | 315/297 |
| 2011/0001436 | A1* | 1/2011 | Chemel et al. | 315/291 |
| 2012/0235579 | A1* | 9/2012 | Chemel et al. | 315/152 |
| 2012/0303554 | A1* | 11/2012 | Osann, Jr. | 705/412 |
| 2013/0159153 | A1* | 6/2013 | Lau et al. | 705/34 |

* cited by examiner

*Primary Examiner* — Ramesh Patel
(74) *Attorney, Agent, or Firm* — Nina Habib Borders; Reed Smith LLP

(57) ABSTRACT

A method and system for using smart bulbs is disclosed. One aspect of certain embodiments includes providing applications to both the consumer and the utility to monitor and control the bulbs and provide an audit trail.

23 Claims, 7 Drawing Sheets

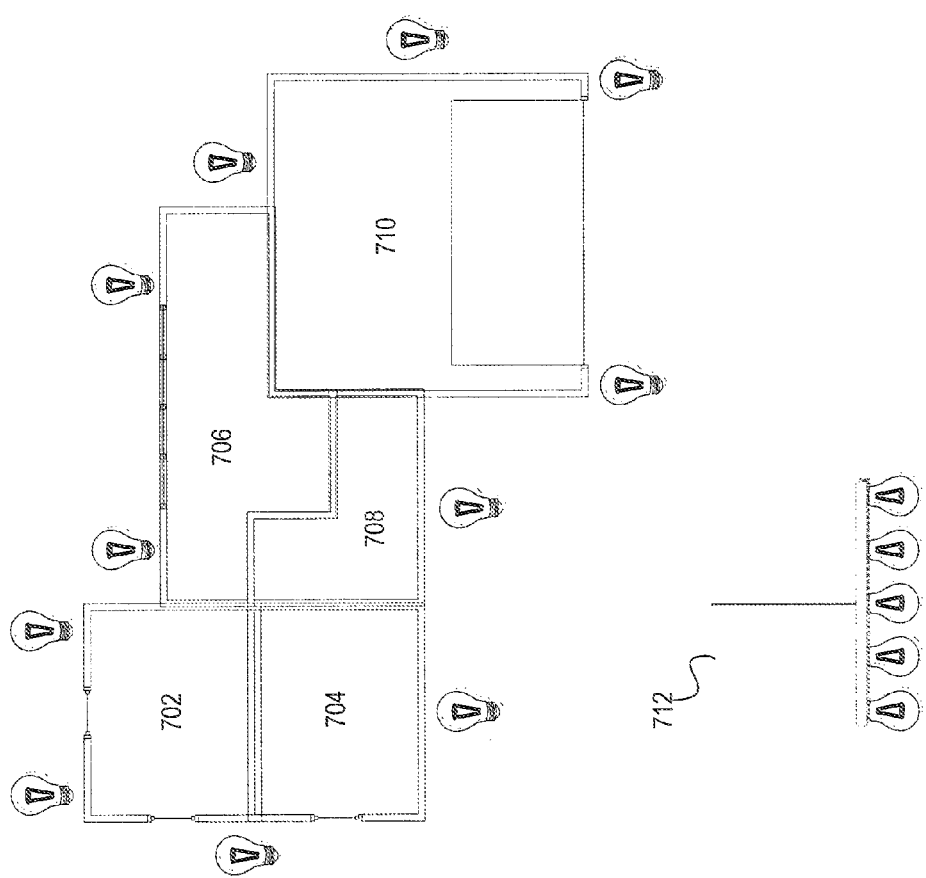

SMART BULB SYSTEM

TECHNICAL FIELD

The disclosed embodiments relate to smart bulbs.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

FIG. 7 illustrates zoning and grouping of smart bulbs, according to certain embodiments.

DESCRIPTION OF EMBODIMENTS

Methods, systems, user interfaces, and other aspects of the invention are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

Figure 1:
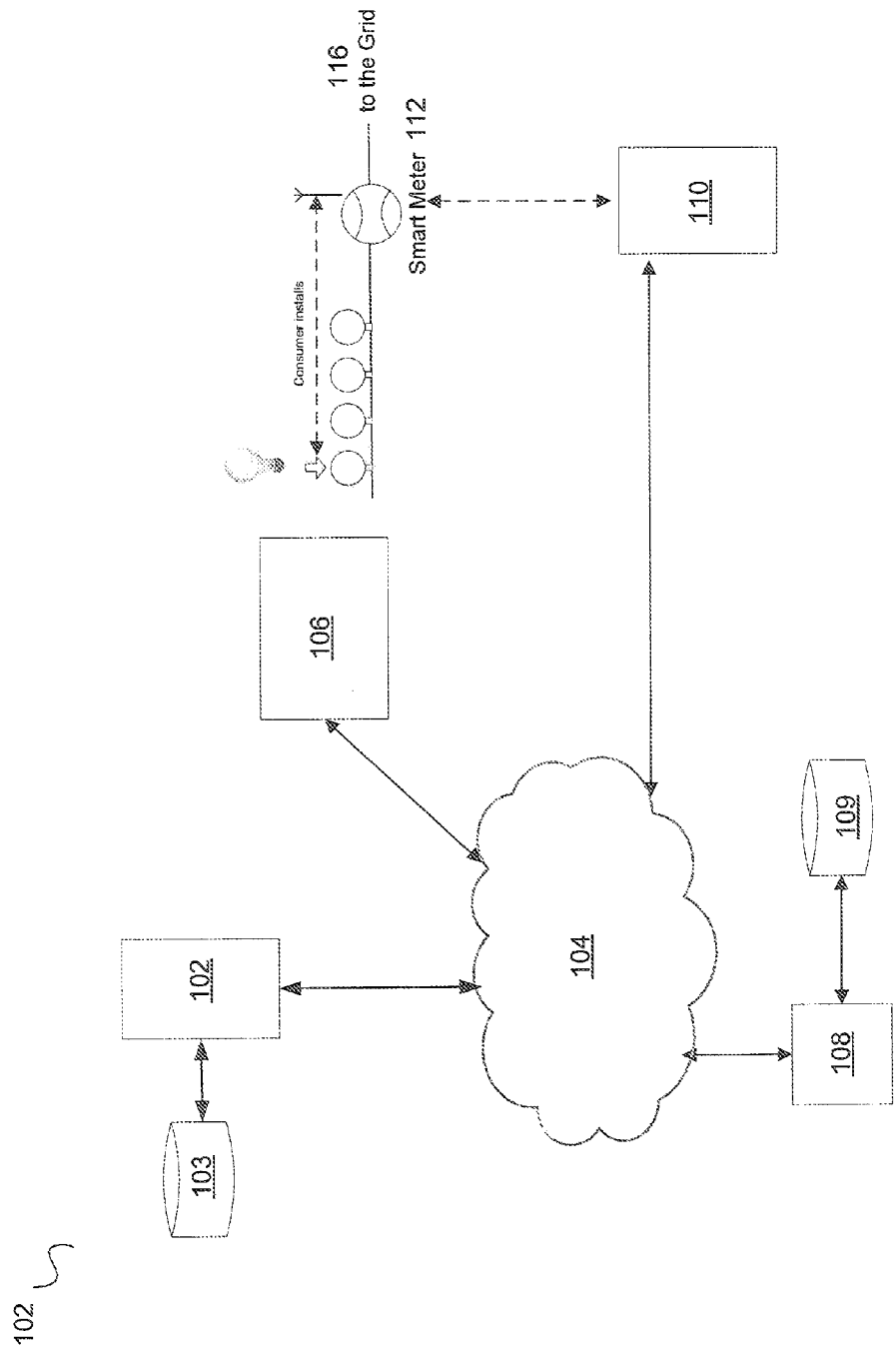
FIG. 1 is a block diagram illustrating a distributed system 100 for using smart bulbs, according to certain embodiments.

FIG. 1 is a block diagram illustrating a distributed system 100 for using smart bulbs, according to certain embodiments of the invention. In FIG. 1, system 100 may include one or more business entities 102, its associated server and database 103, a communications network 104, consumer 106, its associated smart meter 112, an electrical grid 116, collector/smart grid access point 110, a back office server 108 and its associated database 109. Communications network 104 can be the Internet or a WAN. Even though only one consumer and its associated smart meter are shown in FIG. 1, it is understood that there may be multiple consumers and their associated smart meters in distributed system 100. For purposes of illustration, an LED implementation of the smart bulb is described in greater detail herein with reference to FIG. 2. The embodiments are not restricted to LED bulbs. The type of smart bulb may vary from implementation to implementation.

As a non-limiting example, business entity 102 is an energy utility company or some entity that is sponsoring the smart bulb program (herein referred to as a "sponsor"). The utility company has a promotion on smart bulbs, for example. Consumer 106 obtains the smart bulbs and contacts utility 102 website through communication system 104 in order to opt in to the smart bulb program (to obtain reduced-utility rates or rebates for power consumption) and enter consumer information such as smart bulb ID, bulb style, and consumer location. The consumer information is stored in database 103. According to certain embodiments, the identification information for a given smart bulb (smart bulb ID) can be preprogrammed or predefined at the time the bulb is manufactured. When the smart bulb is shipped to a retail store, the smart bulb can be associated with the retail store. When the smart bulb is purchased, by the consumer, the bulb can be associated with the consumer and becomes part of the consumer information that is stored in database 103. Utility 102 can map the consumer location to the appropriate smart meter 112, and rate schedules and power line connection (PLC) or wireless protocol (Wifi, Zigbee, Zwave, for example) associated with the consumer. According to certain embodiments, utility 102 can provide an audit trail to consumer 106 and back office server 108.

When consumer 106 installs a given smart bulb, the smart bulb is associated with an appropriate smart meter 112 and is connected to the electrical grid 116. At installation, the smart bulb "calls home" to the back office server 108 as described in greater detail herein with reference to FIG. 3.

According to certain embodiments, the smart meter 112, using PLC or wireless communication, communicates with back office server 108 and the utility 102 through collector/smart grid access point 110 and communication network 104. The smart bulb registers itself with back office server 108 and associated database 109 and with utility 102. The consumer can use a web based control interface to program and control the consumer's smart bulb from home or remotely over the Internet through the smart meter 112 and collector/smart grid access point 110.

Back office server 108 and associated database 109 store consumer related information such as consumer profile and preferences and at least a subset of the consumer's information stored by utility 102. As a non-limiting example, consumer profile information can include ID of the consumer's smart bulbs. Utility 102 may provide to the back office server 108, consumer information such as consumer ID or business channel ID, offer codes, promotional campaigns, type of smart bulbs, type of smart meter wireless protocols, and rate schedules.

If there is no smart meter associated with the consumer, the smart bulb can communicate with back office server 108 through an internet interface device (internet gateway/broadband access point device). Back office 108 also provides applications that can be accessed by consumer 106 through communications network 104. Consumer can use such applications to control and monitor the consumer's smart bulbs. Back office server 108 can report on power consumption and other information on the use of the smart bulbs to the consumer. Applications for controlling and monitoring the consumer's smart bulbs are described in greater detail herein with reference to FIG. 4 and FIG. 5.

According to certain embodiments, the smart bulb optionally is not connected to smart meter 112 or communications network 104. However, consumer 106 can purchase or otherwise acquire applications via the back office server 108 through another network for purposes of controlling the consumer's smart bulbs.

Figure 2:
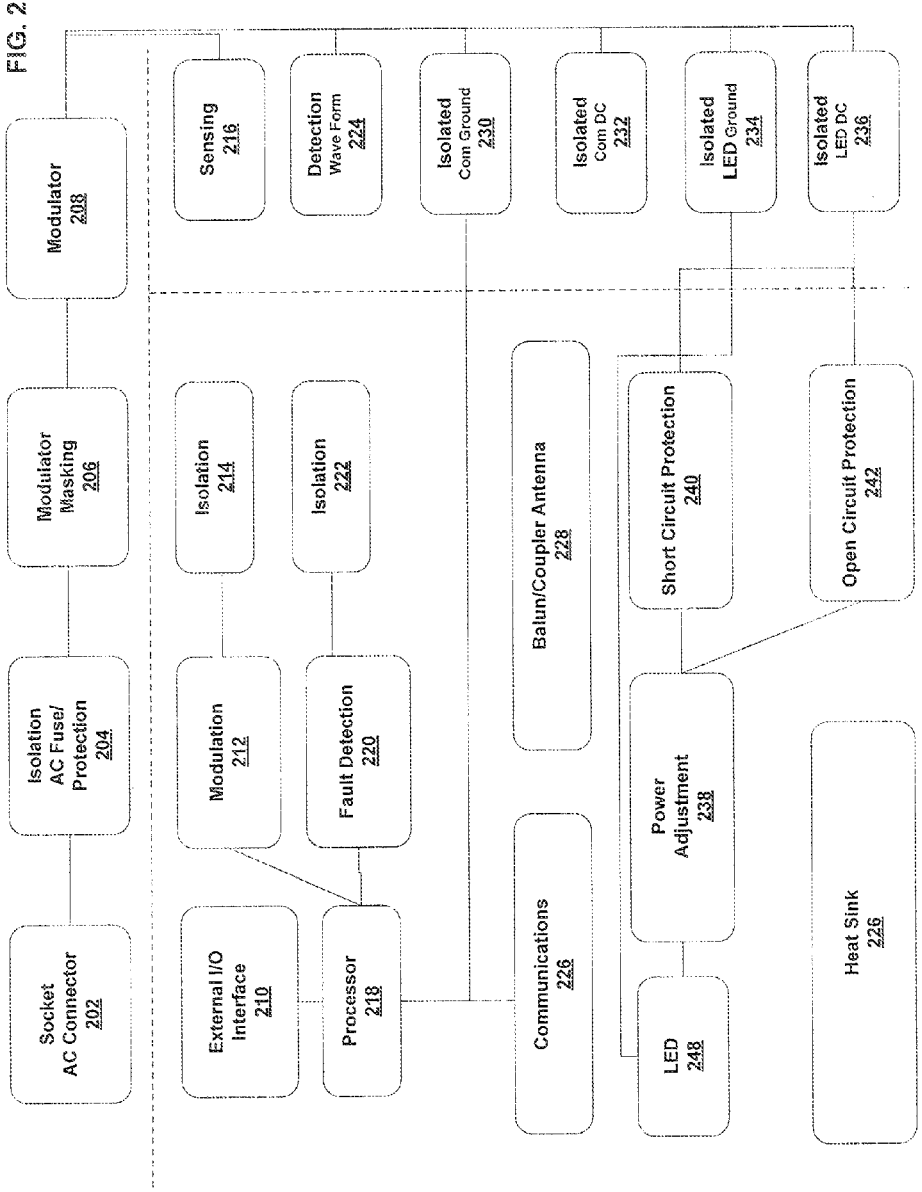
FIG. 2 is a block diagram illustrating the logical elements of a smart bulb, according to certain embodiments.

FIG. 2 is a block diagram illustrating the logical elements of a smart LED bulb, according to certain embodiments. As previously explained, the embodiments are not restricted to LED bulbs. The type of smart bulb may vary from implementation to implementation. The logical elements of the smart LED bulb include socket 202, fuse protection 204, modulator masking 206 and modulator 208. An example of socket 202 is a light bulb socket or a socket on a power strip or on any power connector to connect to the power grid. Fuse protection 204 may be isolated or non-isolated. Modulator masking 206 is for masking frequencies using notch frequency filtering or bandpass filtering, for example. Modulator 208, such as a flyback active modulator, for example, modulates between 100 to 300 kHz based on levels sensed at sensor 216 and detected at AC wave form detector 224. Isolation elements 214 and 222 are optical couplings for isolating external elements, for example, from the smart bulb or I/O ports on the bulb. According to certain embodiments, the elements can include a triac dimmer (not shown in FIG. 2) which modifies the AC wave form provided to socket 202. Signal information (phase and voltage) flows from AC wave form detector 224 to isolation element 222 through fault detection element 220 to processor 218 (micro controller). Processor 218 is able to approximate the amount of dimming requested by the triac dimmer through the signal information path. As a result, processor 218 knows how much power to apply to LED array 248. Processor 218 utilizes modulator 212 to vary the drive power to the light emitting element such as LED 248. Balun/coupler/antenna 228 transmits and receives either an RF signal (Zigbee, Zwave or other RF communication) or the encoded PLC signals to and from the bulb from external sources and the instructions/information are decoded and communicated through communications element 226 to processor 218. The logical elements of the smart bulb also include an external I/O interface 210. External I/O interface 210 is a serial I/O port that can communicate with an external device. For example, an external device can communicate with the local area network or global area network through external I/O interface 210 to processor 218, to communications element 226 and to Balun/coupler/antenna 228. Isolation elements 230, 232 provide a separate clean DC signal and ground reference to power the communications 226/processor 218/external I/O interface 210. The communications 226/processor 218/external I/O interface 210 subsystem are isolated via a separate transformer winding to separate it from the AC power. The logical elements of such an implementation of the smart LED bulb also include power adjustment element 238, short circuit protection element 240, open circuit protection element 242, heat sink 226, isolation element 234 (LED ground) and isolation element 236 which provides a DC LED drive voltage.

As an example, power adjustment element 238 is further used (through processor 218 for adjusting the power going to aging bulbs in order to maintain the luminance of the bulb at a desired level (luminance aging compensation). Such luminance aging compensation is further described in greater detail herein.

As non-limiting examples, processor 218 can be used to control color emissions of the bulbs, signaling, frequencies, luminance and hue aging compensation, illumination control and emergency alert notification as further described in greater detail herein. Further, the logical elements of a smart LED bulb can include a bleeder circuit for powering processor 218 even when the dimmer is set at "off."

Figure 6:
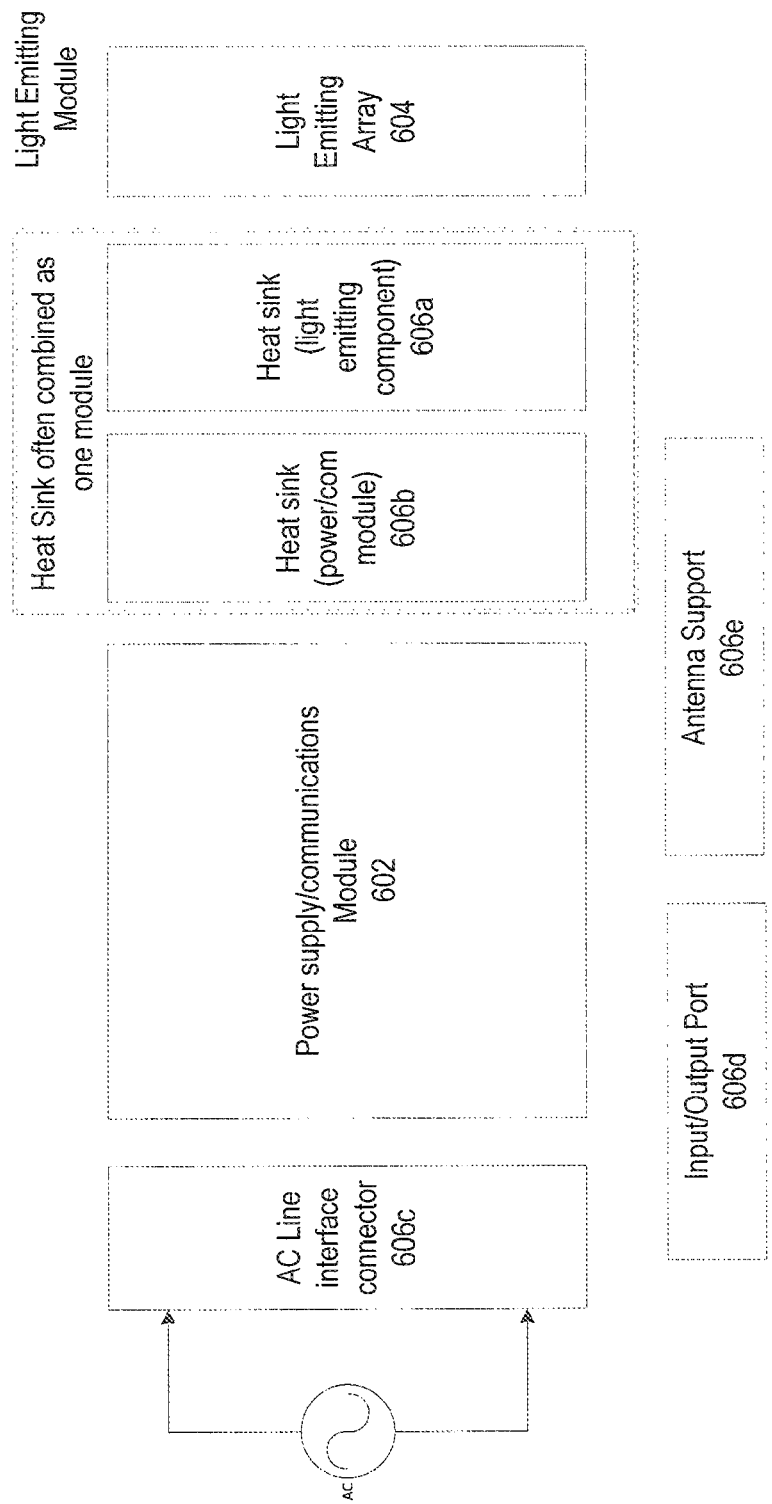
FIG. 6 illustrates a smart modular bulb, according to certain embodiments.

Another embodiment of the smart bulb system is the modular smart bulb shown in FIG. 6.

Such a smart bulb as shown in FIG. 6 comprises several key elements or modules each with a specific function required by the smart bulb functionality:
1. A power supply/communication module 602.
2. A light emitting component 604 (in certain embodiments this is an LED array).
3. A mechanical assembly 606 which provides various functions:
   a. Support for the power supply/communication module
   b. Support for any lensing required by the smart bulb
   c. A heat sink to dissipate excess heat from the light emitting component 606a.
   d. A heat sink to dissipate excess heat from the power supply/communication module 606b.
   e. A connection to the AC power line 606c.
   f. Support for a connector for the external I/O port 606d.
   g. Support for the external antenna 606e.

One embodiment of a smart bulb is as a complete assembly with most but not necessarily all of the above elements. However, there are also valuable embodiments where it is advantageous to physically separate these elements in multiple ways. In the case where certain of these elements/modules are physically separate, the functionality of the smart bulb system can be provided via the above modular smart bulb.

Figure 3:
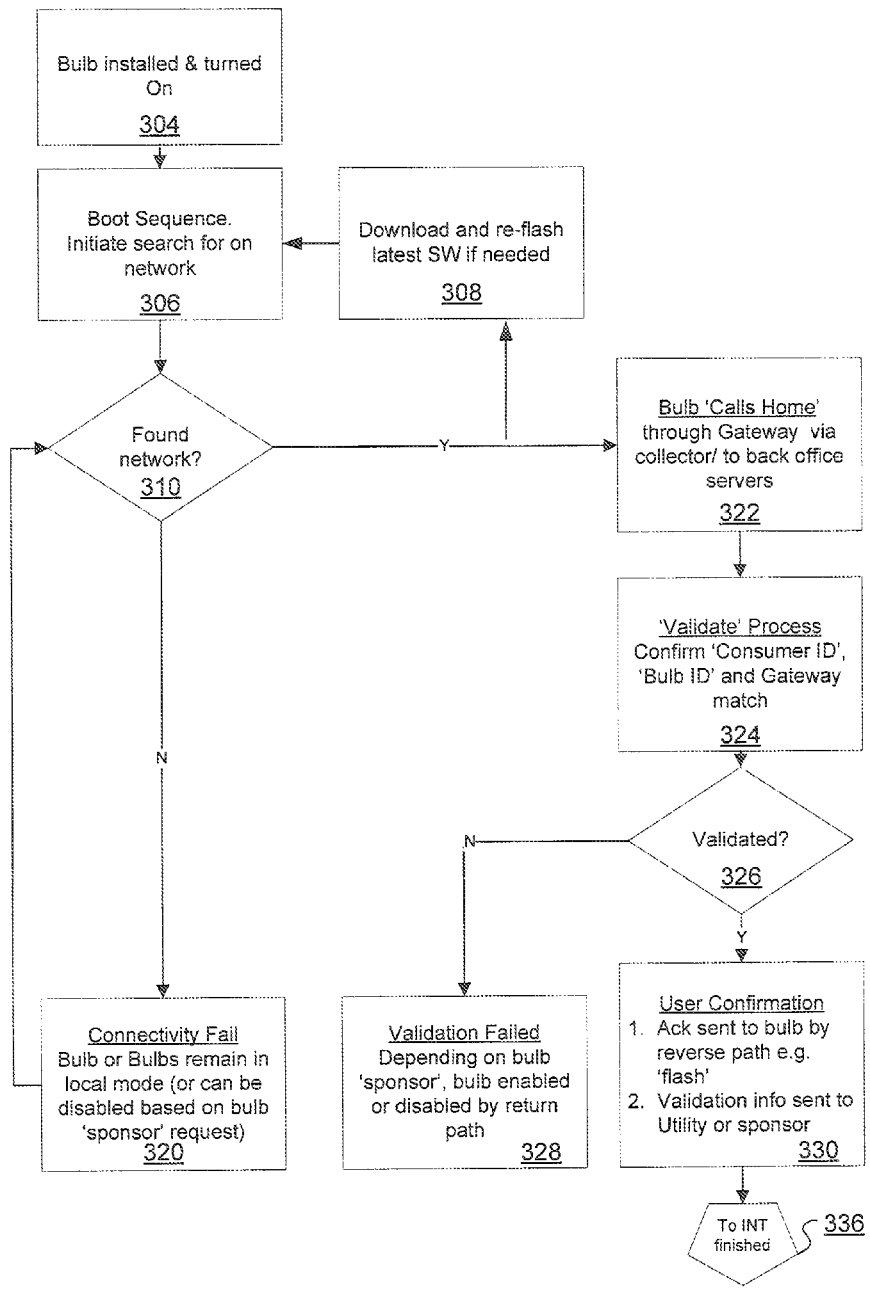
FIG. 3 is a flow chart illustrating the "first light notification process", according to certain embodiments.

FIG. 3 is a flow chart illustrating the "first light notification process" when the smart bulb "calls home" as referenced in FIG. 1 during the smart bulb installation process.

In FIG. 3 at block 304, the smart bulb initialization begins when the smart bulb is installed and turned on. At block 306, a boot sequence is initiated to load the network stack, and thus a search for a network begins. At block 310, it is determined if a network is found. If a network is found, then at block 322, the smart bulb can attempt to call home to back office server 108 through a network gateway and collector/smart grid access point. At block 324, back office server 108 attempts to validate the consumer ID, bulb ID and gateway match based on the information stored in back office database 109. At block 326, it is determined if the information described in block 324 is validated. If such information is validated, then at block 330, an acknowledgment signal is sent to the smart bulb and validation information is sent to utility or sponsor 102. At block 336, the initialization of the smart bulb is complete. If it is determined at block 326 that the information described in block 324 is not validated, then at block 328 the smart bulb is either enabled or disabled depending on the utility/sponsor's smart bulb program.

If at block 310 it is determined that a network is not found, then at block 320, the smart bulb(s) remain in local mode (not connected to the network) and either can be enabled or disabled depending on the utility/sponsors smart bulb program. Further attempts can be made to find a network (block 310) until the initialization process times out.

Figure 4:
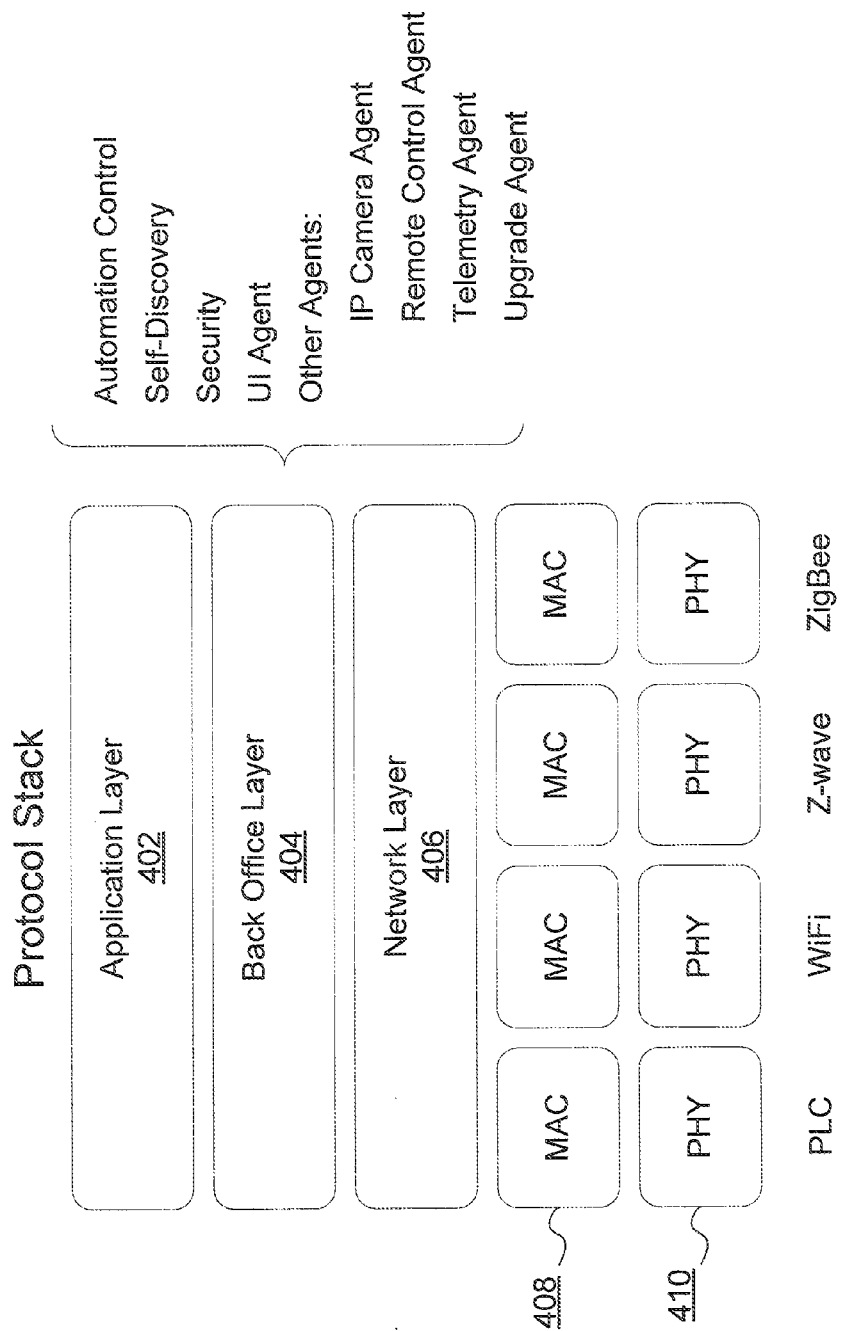
FIG. 4 is a block diagram illustrating the protocol stack for system 100 referred to in FIG. 1 for using smart bulbs, according to certain embodiments.

FIG. 4 is a block diagram illustrating the protocol stack for system 100 referred to in FIG. 1 for using smart bulbs. According to certain embodiments, the protocol stack includes application layer 402, back office layer 404, network layer 406, MAC layer 408 and physical layer 410. Back office layer 404 performs automation control, self discovery and security functions. Back office layer 404 also includes a user interface agent (UI agent) and other agents such as IP camera agent, remote control agent, telemetry agent, firmware upgrade agent, for example. Back office layer is described in greater detail herein with reference to FIG. 6.

In conjunction with the processor 218, and the protocol stack (i.e., network layer 406, media access control layer 408 and the physical layer 410) a connection to the particular network is established using the appropriate communication protocol for the network (e.g., Zigbee, Zwave, WiFi, PLC or other future network implementations).

Once this connectivity is established, the processor, via the back office layer 404 takes control to provide the higher-level functionality of the smart bulb and network, according to certain embodiments. Some key functions that are provided either as functions or as agents by the back office layer include:

1. First light notification functionality (previously discussed with reference to FIG. 3). For example, there are agents that perform "Bulb calls home" followed by "download or reflash of latest software" and so on.
2. Network topology identification (includes grouping & zoning functionality as Illustrated in FIG. 7). For example, agents that aid the smart bulb in determining "Who am I?, Whom am I connected to?, Who are they connected to?, etc.
3. Self-discovery of any specific peripherals connected to the smart bulb I/O port. The back office layer initiates an agent that accesses and downloads via the network, the current firmware required to operate that peripheral. For example, the smart bulb may discover that it has a Wiz-Bang Pro speaker model XYZ attached to it and thus attempts to get the relevant software from the back office server.
4. Discovery/sharing of configuration information to neighboring smart bulbs in the network, group, or zone. For example, the smart bulb discovers sensors such as a temperature sensor, proximity sensor, camera etc. that the smart bulb can access.
5. If the particular smart bulb implementation incorporates temperature, hue, lumen or other sensors, an agent can detect functional irregularities and report such information to the back office server for resolution. For example, the agent can report that the bulb is too hot or that the light output is too low, etc.

Without the back office layer and related agents, a smart bulb would not be so smart and the capabilities are much more limited. For example, it would only support peripherals preloaded at time of manufacture, and may not be able to update its software and so on.

Figure 5:
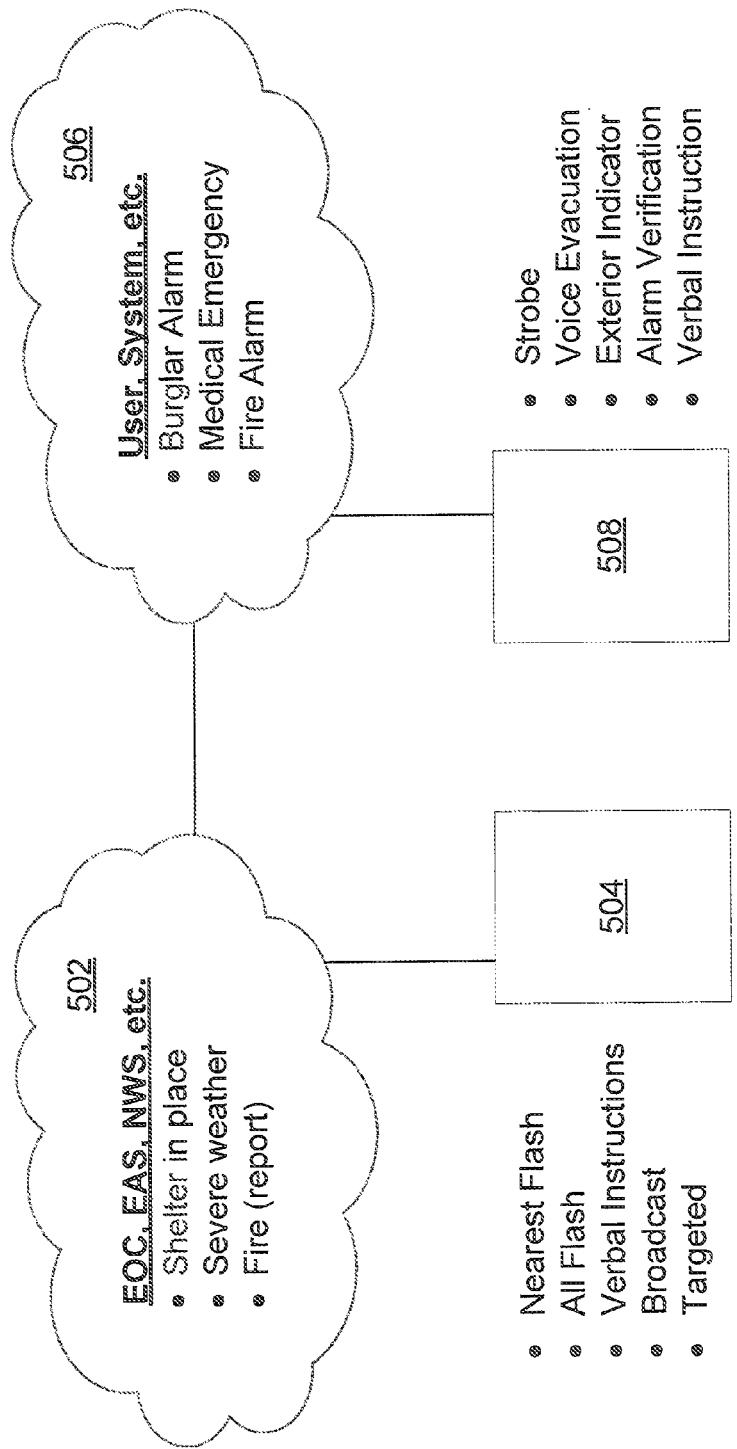
FIG. 5 is a block diagram illustrating an emergency alert notification application, according to certain embodiments.

FIG. 5 is a block diagram illustrating an emergency alert notification application provided by the back office server 108 through the smart bulb system as described herein. According to certain embodiments, the emergency alert notification can be implemented as a notification system personal to the consumer as shown at blocks 506 and 508. The emergency alert notification can also be implemented as a notification in a community-wide system as Shown at blocks 502 and 504. For example, the emergency alert notification system for the consumer (506) can include a burglar alarm, medical emergency alert and fire alarm, for example. The forms of notification (508) can be strobe lights to attract attention, voice instruction for evacuation, exterior building lights turned on or flashing to attract attention, and alarm verification via video cameras or microphones. The notification in a community-wide system (502) can be used to inform the community of emergency shelter locations, severe weather warnings, fire report's, etc., as examples. The forms of notification (504) can include the flashing of a smart bulb system-enabled street light that is nearest the location of interest (shelter or location to be avoided, location of fire, etc), all lights flashing to attract attention (street lights and external building lights, for example), Verbal instructions, broadcast notices, and notifications for targeted locations.

Another example of an application offered by the back office server is multidimensional grouping of smart bulbs for purposes of programmatic control and/or monitoring. FIG. 7 is an illustrative schematic of groups or zones of smart bulbs in a house, according to certain embodiments. For example, the smart bulbs in the house can be associated into zones such as 702, 704, 706, 708 and 710. To illustrate, smart bulbs can be associated into zones for the "living room" 702, or "chandelier" 712 for unified operation. The consumer can turn on/off or dim lights per zone with the flick of a switch or remote control device. A good example of a zone might be all of the outside lights around the house. Even though all of the lights outside the house are not on the same circuit or manual switch, under the smart bulb zoning these lights can be controlled in a unified fashion. This Collection of bulbs would be the outside 'zone' for example. In the "chandelier" 712 example, all of the smart bulbs on the chandelier are on the same circuit and on the same switch. In this case, the smart bulbs on the chandelier are grouped in a manner such that the smart bulbs on the chandelier all turn on and off simultaneously, according to certain embodiments. Other groups could be "family room lights" or "hallway lights."

A further grouping can be a collection of zones (e.g., superset of zones and smaller groups), one or more bulbs in one or more zones, or bulbs designated for a particular purpose. For example, the consumer can designate specific bulbs to participate in the utility company's power set back program (lights dimmed or turned off at certain peak usage periods, as an example). According to certain embodiments, public street lights in a community may be grouped into zones if the community is using applications provided by back office server 108. For example, certain zones of street lights can be dimmed to save power at certain periods). As another example, certain street lights can flash as part of an emergency alert notification.

As another example, the consumer can designate specific bulbs to participate in an emergency notification system. To illustrate, the front porch lights are designated to flash in case of a medical emergency, or all lights in the house flash in case of a fire alarm. To summarize, the control input or triggers can be manual (by consumer input), scheduled (example, lights programmed to turn off/on at certain periods), sensor input (example, motion detector to turn on lights or activate a security camera), utility program (example, power set back program), or emergency alert notification.

Energy consumption reporting is another application that can be provided by back office server 108, according to certain embodiments. Each smart bulb that has "called home" can be identified by the back office server and, by the consumer. The back office server can provide a report on power consumption for each bulb to utility/sponsor and to the consumer. The report can include tracking both dollar savings and energy usage as a result of using the smart bulb system. Dollar savings from the power set back program can also be tracked and reported to the consumer. According to certain embodiments, the consumer can readily access and audit the reports using web based or mobile applications provided by the back office server.

Innovative illumination control is another application that can be provided by back office server 108, according to certain embodiments. This application provides al non-invasive dimming control function. To explain, the smart bulbs (zones or groupings of bulbs designated by the consumer) can be dimmed gradually so that the dimming is imperceptible by persons in the location that is illuminated by the designated bulbs. According to certain embodiments, if the utility company is controlling the dimming process (as part of an energy saving program, for example), it may be desirable that the dimming be imperceptible. On the other hand, if the consumer is controlling the dimming process, the dimming may be such that it is perceived to be almost instantaneous. The bulbs in the group or zone are dimmed in unison. The dimming instruction can originate either from the consumer or the utility company and the innovation in how that same instruction (e.g., dim to 80% of full brightness) is executed as noted above.

Luminance or hue aging compensation is another application that can be provided by back office server 108, according to certain embodiments. To explain, the luminance output of a smart bulb that is implemented with LEDs decreases over time. A positive luminance, compensation (higher drive current) can be applied to an aging bulb based on the cumulative usage (period of usage and at what temperature) of the bulb to bring the bulb close to perceived original luminance output. For example, the power to a specific bulb can be increased to compensate for the aging bulb's loss of efficiency. According to certain embodiments, by design, the back office server tracks and tabulates the usage and temperature of the smart bulbs. Such information in conjunction with information on the aging characteristics of the smart bulb enables the compensation technique and is applicable not only to the luminance but also to hue aging.

According to certain embodiments, the smart, bulb can include a peripheral I/O port to support external devices such as cameras, speakers, and/or sensors. Each of these external devices may have different power requirements and may need more power than the bulb can provide. In such a case, a supplemental auxiliary power device can be provided by the peripheral maker or other party to supply the amount of power that is appropriate for the given external device. The supplemental power device will require a connection to the AC high voltage, and thus will feature both a connector and socket, and is positioned between the socket, and smart bulb.

Sensor sharing is another application that can be provided by back office server 108, according to certain embodiments. The smart bulb can include one or more sensors. In certain embodiments, these sensors can be internal or connected to the bulb via the external I/O port. For example, one of the sensors can detect smoke from a fire and that bulb can share the information from the sensor with other bulbs over the network. Other examples of sensors/transducers are ones for detecting motion, voltage, current, temperature, vibration, explosives or chemicals, as well as security door or window sensors.

The foregoing description, for purpose of explanation, has been described with reference to specific embodiments. However, the illustrative discussions above are not intended to be exhaustive or to limit the invention to the Precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

We claim:

1. A computer-implemented method for using a cloud-based smart bulb system with multiple parties for the purpose of operating, tracking, and reporting the function of the smart bulb system, the computer-implemented method comprising:
    associating one or more smart bulbs of the smart bulb system with one or more consumers by entering consumer information and smart bulb information in a database;
    allowing the one or more consumers associated with the smart bulb system to communicate with a remote back office server:
    validating consumer information and smart bulb information based on information stored in the database associated with the remote back office server before the smart bulb is enabled;
    wherein the remote back office server:
    enables the one or more consumers to monitor and control smart bulbs associated with the consumer; and
    enables the one or more consumers to communicate with one or more business entities associated with the smart bulb system.

2. The computer-implemented method of claim 1, further comprising storing consumer related information at the back office server and associated database.

3. The computer-implemented method of claim 2, wherein the consumer related information includes at least a subset of: consumer ID, business channel ID, offer codes, information on promotional campaigns, type of smart meter wireless protocols, and rate schedules.

4. The computer-implemented method of claim 1, further comprising providing the consumer access to applications to control the smart bulbs associated with the consumer.

5. The computer-implemented method of claim 1, further comprising providing to the consumer power consumption information associated with the consumer's smart bulbs.

6. The computer-implemented method of claim 1, further comprising providing to the consumer billing information associated with the consumer's smart bulbs.

7. The computer-implemented method of claim 1, further comprising providing to the consumer information related to characteristics and functionality of the consumer's smart bulbs.

8. The computer-implemented method of claim 1, further comprising enabling discovery of peripherals connected to a given smart bulb of the consumer.

9. The computer-implemented method of claim 8 further comprising enabling an agent to access and download current software to operate the peripheral.

10. The computer-implemented method of claim 1, further comprising enabling network topology identification including grouping and zoning of the consumer's smart bulbs.

11. The computer-implemented method of claim 1, further comprising enabling determination and sharing of smart bulb configuration information among the consumer's smart bulbs.

12. The computer-implemented method of claim 1, further comprising enabling one or more sensors on a given consumer's smart bulb to report information on the smart bulb's functions and conditions to the back office server.

13. The computer-implemented method of claim 12, wherein the information on the smart bulb's functions and conditions include functional irregularities, bulb hue, bulb lumen, and bulb temperature.

14. The computer-implemented method of claim 1, further comprising providing the consumer access to applications to implement an emergency alert notification system using the smart bulbs associated with the consumer.

15. The computer-implemented method of claim 14, wherein the emergency alert notification system is personal to the consumer.

16. The computer-implemented method of claim 14, wherein the emergency alert notification system is part of a community wide alert system.

17. The computer-implemented method of claim 1, further comprising enabling multidimensional grouping of the consumer's smart bulbs for programmatic control and monitoring of the consumer's smart bulbs.

18. The computer-implemented method of claim 1, further comprising enabling illumination control of the consumer's smart bulbs through a non-intrusive dimming control application.

19. The computer-implemented method of claim 1, further comprising enabling luminance or hue aging compensation of the consumer's smart bulbs.

20. The computer-implemented method of claim 1, further comprising enabling external devices to be connected to a given smart bulb of the consumer.

21. The computer-implemented method of claim 20, further comprising supplying an auxiliary power to external devices connected to the given smart bulb of the consumer.

22. The computer-implemented method of claim 1 wherein at least one of the one or more business entities is a utility company.

23. A cloud-based smart bulb system for operating, tracking, and reporting the functionality of smart bulbs; the system comprising:
one or more business entities;
a server and database associated with each of the one or more business entities;
one or more consumers who obtain one or more smart bulbs from the one or more business entities, wherein the one or more smart bulbs become associated with the one or more consumers by entering consumer information in the database;
a remote back office server, the remote back office server enabling the one or more consumers to monitor and control the one or more smart bulbs associated with the one or more consumers and further enabling the consumer to communicate with the one or more business entities;
a smart meter associated with the one or more smart bulbs that is associated with each of the one or more consumers, wherein the smart meter connects the one or more smart bulbs to an electrical grid and wherein the smart meter communicates with the back office server and the one or more business entities through a smart grid access point and a communication network; and
a database associated with the remote back office server.

* * * * *